United States Patent [19]

Miller et al.

[11] Patent Number: 4,919,375
[45] Date of Patent: Apr. 24, 1990

[54] SUPPORT STRUCTURE FOR A FLUID CONTAINER

[75] Inventors: Steven L. Miller, Shelby County; Ronald L. Wathen, Jefferson County, both of Ky.

[73] Assignee: Environmental Water Technology, Inc., Louisville, Ky.

[21] Appl. No.: 333,263

[22] Filed: Apr. 5, 1989

[51] Int. Cl.⁵ ............................................. A47G 23/02
[52] U.S. Cl. .................................................. 248/152
[58] Field of Search ............... 248/152, 154, 146, 148, 248/177, 523, 524

[56] References Cited

U.S. PATENT DOCUMENTS

| | | | |
|---|---|---|---|
| 1,303,171 | 5/1919 | Curtin | 248/146 |
| 2,486,907 | 11/1949 | Amberg et al. | 248/146 |
| 2,666,310 | 1/1954 | Hill | 248/146 |
| 3,337,109 | 8/1967 | Shumrak | 248/148 X |
| 4,290,573 | 9/1981 | Shapiro | 248/152 |

Primary Examiner—Ramon O. Ramirez
Attorney, Agent, or Firm—Polster, Polster & Lucchesi

[57] ABSTRACT

Support structure for a tank wherein an outer peripheral skirt member and an inner peripheral skirt member disposed in the outer skirt member are joined together along their corresponding upper and lower edges to nestingly receive a conforming lower portion of a tank to be supported by the joined together skirt members.

12 Claims, 1 Drawing Sheet

SUPPORT STRUCTURE FOR A FLUID CONTAINER

BACKGROUND OF THE INVENTION

The present invention relates to structural supports and more particularly to support structure for various types of containers, particularly fluid holding tank members.

Past support members for various types of containers ranging from small cups, washstands and heavy liquid storage tanks have been comparatively complex in design, manufacture and assembly, requiring a number of structural parts, jigs and assembly steps in their respective manufacture and assembly, particularly in those instances where heavy liquid storage tanks need be supported. In this regard, attention is directed to early U.S. Pat. No. 395,409, issued to G. F. Waters on Jan. 1, 1889, and U.S. Pat. No. 1,303,171 issued to D. F. Curtin on May 6, 1919 on small cup support arrangements; to U.S. Pat. No. 775,191, issued to M. W. Reeves on Nov. 15, 1904 on jar display structure; to U.S. Pat. No. 1,795,925, issued to M. E. Block on Mar. 10, 1931, and U.S. Pat. No. 2,500,490, issued to A. D. Grenga on Mar. 14, 1950 on laundry tub supports; and finally to the heavier liquid storage tank support arrangements in U.S. Pat. No. 2,279,958, issued to J. H. Snyder, et al. on Apr. 14, 1942, U.S. Pat. No. 2,523,274, issued to H. C. Boardman on Sept. 26, 1950, and U.S. Pat. No. 2,870,982, issued to O. W. Greene, et al. on Jan. 27, 1959.

In accordance with the present invention, many of the manufacturing and assembly problems associated with the production of past container support arrangements have been avoided, the present invention providing a novel comparatively light but sturdy structural support arrangement for containers which uniformly transmits container weight over the surface on which it is mounted and inherently sustains tripod characteristics regardless of the mounting surface due to its structural stiffness. Further, the present invention provides a support arrangement which requires a minimum of parts that can be readily manufactured at plant site with a minimum of jigs and with a minimum of production steps and that can be readily assembled either at a plant site or in the field in an efficient, straightforward and economical manner.

Various other features of the present invention will become obvious to one skilled in the art upon reading the disclosure set forth herein.

BRIEF SUMMARY OF THE INVENTION

More particularly, the present invention relates to a support structure for a container comprising: an outer peripheral skirt member having an upper edge sized to nestingly engage a first peripheral wall portion of a container supported thereby; an inner peripheral skirt member disposed within said outer skirt member and having an upper edge sized to nestingly engage a second peripheral wall portion of the container inwardly of the first peripheral wall portion of the container, the upper edge of the inner peripheral skirt member being horizontally spaced inwardly from the upper edge of the outer peripheral skirt member; first structural connection means supportively connecting the upper edge of the outer peripheral skirt member to the spaced upper edge of the inner peripheral skirt member; and, second structural connection means connecting the lower edge of the inner peripheral skirt member at a location substantially adjacent the lower part of the outer peripheral skirt member. In addition, the present invention provides a novel crenulated structural connection arrangement which accommodates for structural stress and minor sizing differences which might occur in manufacture and/or assembly. Further, the present invention provides a novel crenulated and dovetailing structural arrangement for joining the peripheral edges of inner and outer skirt members to enhance supporting stability of the assembly.

It is to be understood that various changes can be made by one skilled in the art in one or more of the several parts of the apparatus disclosed herein without departing from the scope or spirit of the present invention. For example, although the drawing discloses circular skirt members, the inner and outer skirt members can be of an elliptical-like geometric configuration to accommodate a lower, elongated side wall of a longitudinally extending container and a part of the container itself can be included as part of the support structure.

BRIEF DESCRIPTION OF THE DRAWING

Referring to the drawing which discloses one advantageous embodiment of the present invention and a modification thereof.

DETAILED DESCRIPTION OF THE DRAWING

Figure 1:
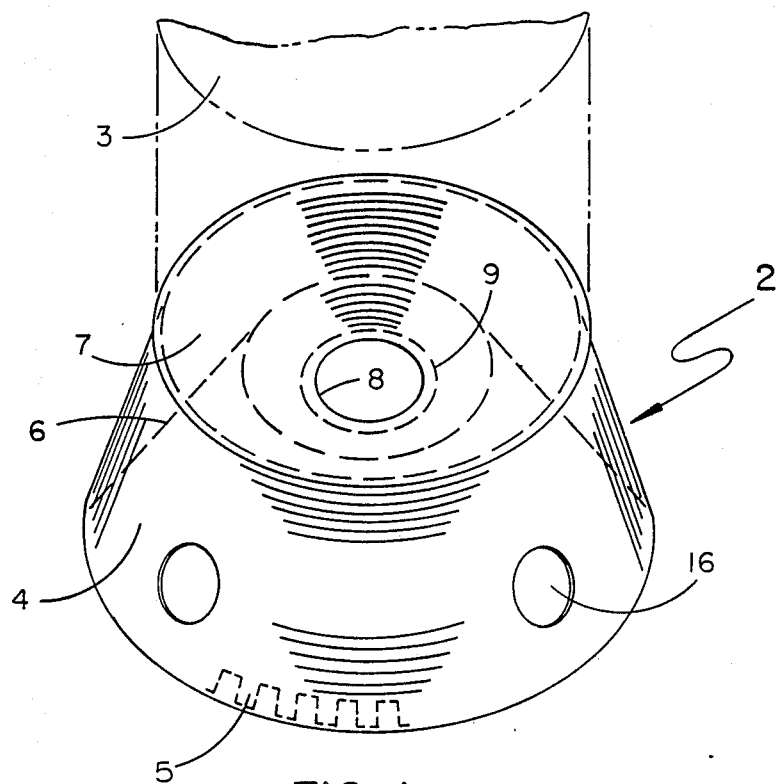
FIG. 1 is an isometric view of the novel support structure of the present invention showing the lower portion of a supported cylindrical tank in phantom and also showing in broken lines a portion of the crenulations on the lower edge of the inner peripheral frustrum contoured skirt member in cooperative relation with the outer peripheral frustum contoured skirt member.

As can be seen in FIG. 1 of the drawing, the novel frustrum shaped container support structure 2 is disclosed in assembled condition to receive the conforming lower or bottom end of a cylindrical container 3 in the form of a tank (shown in phantom). In this regard, it is to be understood that, although a frustrum type support structure is disclosed herein, the features of the present invention described hereinafter can be utilized with support structures of other geometrical configurations to support other conforming portions of other shaped containers. For example, a support structure in the geometrical form of an ellipse can incorporate the novel features herein, to support the elongated conforming lower side wall of a container in the form of a tank.

As can be seen in FIG. 1, frustrum type container support structure 2 includes an outer peripheral, frustrum shaped skirt member 4 assembled in circular configuration to have an open upper edge thereof sized to nestingly receive and engage a conforming bottom wall portion of tank 3, passing therethrough. Disposed within outer frustrum skirt member 4 and also assembled in corresponding circular configuration is inner frustrum shaped skirt member 6 having an open upper edge spaced horizontally inwardly from the upper edge of outer skirt member 4 and vertically therebelow. Frustrum shaped skirt members 4 and 6, which can be formed from any one of a number of suitable materials in accordance with the size and weight of the container to be supported thereby, can—when a heavy liquid tank is involved—be of a suitable gauge rolled steel, cut in an appropriately flat pattern form and then turned, erected and welded along opposed joined ends to be of frustrum shape configuration with inner skirt member 6 sloping downwardly and outwardly at an angle greater than the downwardly and outwardly sloping angle of the outer skirt member 4 so that the bottom edge of the inner skirt member 6 is adjacent to and abuts the bottom edge of outer skirt member 4. To relieve stress conditions and to allow for forming discrepancies, the lower edge of the inner peripheral skirt member 6 can be provided with spaced crenulations 5. These crenulations can be provided along the entire lower edge of inner skirt member 6 or can be selectively spaced along the lower edge as existing conditions might indicate, the crenulations being turned to abut and be joined, such as by welding, to the inner face of outer skirt member 4 adjacent the lower edge thereof.

Again referring to FIGS. 1 and 2 of the drawing, it can be seen that an annularly, frustrum shaped concave plate member 7 is provided. Annular plate 7 is contoured so that the upper face thereof conforms with and nestingly receives the bottom wall portion of tank 3 to be supported thereby. Annular plate 7, which also can be of rolled steel, is so sized that the outer periphery can be abuttingly joined by welding to the upper edge of outer peripheral skirt member 4. The inner portion of annular plate 7 abuts and extends inwardly beyond the upper edge of inner peripheral skirt member 6 and can be suitably welded thereto. It is to be noted that the inner periphery of plate 7 defines a centrally disposed aperture 8 through which the bottom wall of tank 3 extends. To stiffen the annular plate 7 around aperture 8, an annular stiffener plate 9 can be welded to the lower face of plate 7 to surround the centrally disposed aperture 8 and thus stiffen such annular plate member 7 therearound although not shown in detail in the drawing, it is to be understood that the bottom 7' of tank 3 can itself serve as plate 7.

Figure 2:
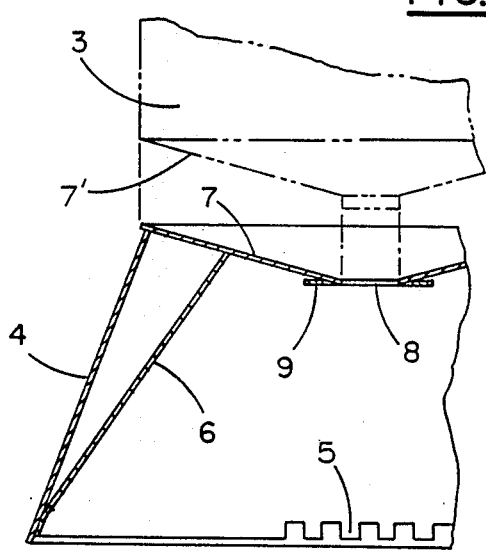
FIG. 2 is an enlarged cross-sectional view of a portion of the tank and frustrum structure of FIG. 1.
Figure 4:
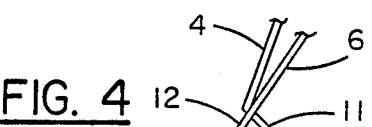
Figure 3:
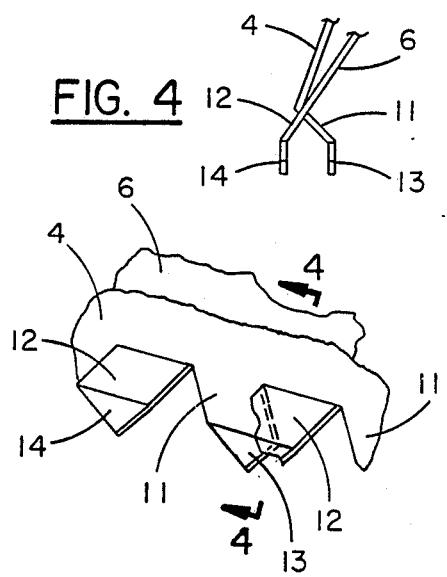
FIG. 3 is a modified embodiment of a portion of the structure of FIGS. 1 and 2, showing crenulations for the lower edges of both inner and outer peripheral skirt members in dovetailing and ground engaging relation; and, FIG. 4 is a cross-sectional view of a portion of the structure of FIG. 3 taken in a plane through line 4—4 of FIG. 3.

Referring to FIGS. 3 and 4 of the drawing, which disclose a modification of the crenulations in FIGS. 1 and 2, it can be seen that the lower edges of both outer skirt member 4 and inner skirt member 6 can be provided with crenulations 11 and 12 respectively with the crenulations being offset to dovetail in interlocking, fastened relation with each other. Suitable welds can be provided adjacent the interlocking crenulations, if desired, to assure support structure stability. Further, the dovetailing crenulations 11 and 12 can be shaped to have pointed extremities 13 and 14 respectively turned to extend normally to ground surface to be buried therein for overall stability of support structure 2. Finally, it is to be understood that suitable access holes 16 can be provided in the peripheral skirts as needed for joining assembly and access to the bottom portion of the container supported thereby and that, if required because of container size and weight, a second reinforcing peripheral skirt member can be utilized in spaced, inner relation from the outer skirt member.

Thus, in accordance with the present invention, a unique and novel support structure assembly is provided for stably supporting containers of various sizes, types and weights in a straight-forward, economical and efficient manner with a minimum of structural parts and a minimum of assembly steps, a number of which can be accomplished either at plant site or in the field.

The invention claimed is:

1. Support structure for a container comprising:
    an outer peripheral skirt member having an upper edge sized to nestingly engage a first preselected peripheral wall portion of a container supported thereby;
    an inner peripheral skirt member disposed within said outer skirt member and having an upper edge sized to nestingly engage a second preselected peripheral wall portion of said container inwardly of said first peripheral wall portion of said container said upper edge of said inner peripheral skirt member being horizontally spaced inwardly from said upper edge of said outer peripheral skirt member with said inner peripheral skirt member sloping downwardly and outwardly toward said outer peripheral skirt member with the lower edge of said inner peripheral skirt member extending adjacent to the inner face of said outer peripheral skirt member;
    first structural connection means supportively connecting said upper edge of said outer peripheral skirt member to said spaced upper edge of said inner peripheral skirt member; and
    second structural connection means connecting said lower edge of said inner peripheral skirt member at a location substantially adjacent said inner face of said outer peripheral skirt member.

2. The support structure for a container of claim 1, said upper edge of said inner peripheral skirt member being vertically spaced below said open upper edge of said outer peripheral skirt member.

3. The support structure for a container of claim 1, said first structural connection means connecting said upper edges of said outer and inner skirt members comprising a plate member which plate member can be a portion of said container wall.

4. The support structure for a container of claim 1, said upper edge of at least one of said peripheral skirt members surrounding an opened area.

5. The support structure for a container of claim 1, said first structural connection means connecting the spaced upper edges of said outer and inner skirt members including a separately shaped plate member preselectively contoured so that the upper face of said plate member conforms with and nestingly receives the lower portion of a container wall to be supported thereby and the lower face of said plate member conforms in contacting relation with said horizontally spaced upper edges of said outer and inner skirt members.

6. The supporting structure for a container of claim 1, said first structural connection means connecting the spaced upper edges of said outer and inner skirt members including a shaped plate member preselectively contoured so that the upper face of said plate member conforms with and nestingly receives the lower portion of a container wall to be supported thereby and the lower face of said plate member conforms with and contacts the spaced upper edges of said skirt members, said plate member extending inwardly beyond said upper edge of said inner skirt member and including a centrally disposed aperture to engage a lower most portion of a supported container wall with the lower face having an aperture surrounding stiffener fastened thereto.

7. The supporting structure for a container of claim 1, at least one said outer and inner skirt members being of frustrum shape with said inner skirt sloping downwardly and outwardly from the vertical at an angle greater than the angle which said outer skirt slopes downwardly and outwardly with the lower edge of said inner peripheral skirt member intersecting said outer peripheral skirt substantially adjacent the lower edge thereof.

8. The support structure for a container of claim 1, said inner skirt member sloping downwardly and outwardly at a preselected angle relative said outer skirt member with the lower edge thereof intersecting said outer peripheral skirt member substantially adjacent the lower edge thereof.

9. The support structure for a container of claim 1, said lower edge of said inner skirt member including a crenulated perimeter with spaced crenulations being fastened to said outer peripheral skirt member to accommodate for any distortions.

10. The support structure for a container of claim 1, said lower edges of said outer and inner skirt members including offset crenulated perimeters with the crenulations thereof dovetailing in fastened relation.

11. The support structure for a tank of claim 10, said dove-tailing crenulations having pointed extremities extending normal to ground surface to bury therein.

12. Support structure for a fluid tank comprising:
an outer peripheral skirt member of frustrum configuration having an open upper edge sized to nestingly engage a first peripheral bottom wall portion of a cylindrical tank passing therethrough;
an inner peripheral skirt member also of frustrum configuration disposed within said outer skirt member, said inner skirt member having an open upper edge spaced horizontally inwardly from said upper edge of said outer skirt member and vertically therebelow, said outer and inner skirt members of frustrum shape having said inner skirt member sloping downwardly and outwardly at an angle greater than the downwardly and outwardly sloping angle of said outer skirt member with the lower edge of said inner peripheral skirt member having spaced crenulations facingly abutting and joined to said surrounding outer peripheral skirt member adjacent the lower edge of said outer peripheral skirt member;
an annularly frustrum shaped concave plate member contoured so that the upper face thereof conforms with and nestingly receives the bottom portion of a tank wall to be supported thereof, said plate member being so sized that the outer periphery of said plate member is abuttingly joined to the upper edge of said outer peripheral skirt member and the inner portion thereof is abuttingly joined to and extends inwardly beyond the upper edge of said inner peripheral skirt member with the inner periphery defining a centrally disposed aperture through which said bottom portion of said tank wall extends; and,
an annular stiffener fixed to the lower face of said annular plate member to surround said centrally disposed aperture and stiffen said plate member therearound.

* * * * *